United States Patent [19]

Brugler

[11] 4,178,117

[45] Dec. 11, 1979

[54] MOBILE SIDE-BY-SIDE BATCHING PLANT

[75] Inventor: Richard K. Brugler, Warren, Ohio

[73] Assignee: Heltzel Company, Warren, Ohio

[21] Appl. No.: 874,620

[22] Filed: Feb. 2, 1978

[51] Int. Cl.[2] .......... B65G 67/08

[52] U.S. Cl. .......... 414/21; 414/268; 414/285; 414/332

[58] Field of Search .......... 214/16 R, 2, 17 A, 17 D; 366/16, 18, 33, 37, 41

[56] References Cited

U.S. PATENT DOCUMENTS

| | | | |
|---|---|---|---|
| 2,687,285 | 8/1954 | Fisher | 214/2 X |
| 2,975,884 | 3/1961 | Kayser | 214/2 X |
| 3,251,484 | 5/1966 | Hagan | 214/2 |
| 3,343,688 | 9/1967 | Ross | 214/2 |
| 3,905,586 | 9/1975 | Wall, Jr. | 366/18 |
| 3,945,619 | 3/1976 | Taibi | 214/2 X |
| 3,998,436 | 12/1976 | Allen et al. | 214/2 X |

*Primary Examiner*—Albert J. Makay
*Attorney, Agent, or Firm*—Wilkinson, Mawhinney & Theibault

[57] ABSTRACT

The present disclosure is directed to a mobile side-by-side batching plant wherein the aggregate storage bins are disposed end-for-end along one side of the longitudinal center line of the supporting, transporting frame. The cement storage bin is disposed in contingous substantially coextensive relation therewith, along the other side of the center line of the supporting transporting frame. Batching conveying and handling means are provided in receiving relation under the several storage bins for the reception proportioning and delivery of selected aggregate and cement.

3 Claims, 6 Drawing Figures

MOBILE SIDE-BY-SIDE BATCHING PLANT

THE PRIOR ART

Mobile batching plants have been utilized in the industry for many years. They have been recognized for the advantages they lend to concrete construction facilities. As they pertain to my invention, the most pertinent patents of which I am aware, are U.S. Pat. Nos. 2,271,434; 2,687,285; 2,900,235; 2,967,629; 2,988,235; 3,101,931; 3,207,327; 3,295,698; 3,406,839; 3,945,619; 3,986,708; 3,994,404. While each of these prior art devices represents a forward step, each is deficient with regard to mobility and compactness.

An object of this invention is the provisions of a one-piece plant mounted upon a single frame which, when blocked in place, requires that only the cement batcher, screw charging conveyor and aggregate charging belt be pivotable vertically for truck charging height.

A further object of this invention is the provision of a mobile plant where the cement and aggregate storage bins are combined into a unitary receptacle, all fixedly mounted side-by-side, upon a vehicle frame whereby to provide the advantages of mobility while substantially reducing the cost of manufacture thereof.

A further object of this invention is the provision of a mobile plant whose storage compartments are disposed in side-by-side relation whereby such compartments may be charged from one side of the vehicle.

A further object of this invention is the provision of a side-by-side compartmented mobile plant whose profile configuration is low thereby rendering it adaptable for installation inside a building.

A further object of this invention is the provision of an improved mobile concrete batching plant of high capacity and large storage.

Yet a further object of this invention is the provision of a mobile batching plant mounted upon an integral frame as a single vehicle whose dimensions are within those appropriate for traveling upon public highways.

A further object of the present invention is the provision of a mobile batching plant which may be readily and rapidly placed in position for operation without the need for a crane or other cumbersome equipment.

A further object of the present invention is the provision of a single integral storage bin which provides the combined functions of storage of cement and the individual storage of each of the several aggregates.

A further object of the present invention is the provision of a mobile batching plant which, when erected, retains a low center of gravity whereby to lessen the foundation requirements and preparation.

Still another object of this invention is the provision of a mobile concrete batching plant mounted upon a wheel supported frame and detachably connected in trailing relation to a towing vehicle, whereby upon arrival at the working site, the batching plant may be detached from the towing vehicle, firmly based upon the ground and set up for operation. One salient advantage in this arrangement is that the towing vehicle may be released for other purposes, thereby realizing a substantial saving in cost of operation.

Yet another object of this invention is the provision of a mobile concrete plant which is easily and readily adapted for other concrete producing applications, such as central-mix and concrete products operations.

With the foregoing and other objects in view the invention will be more fully described hereinafter and more particularly pointed out in the appended claims.

Figure 1:
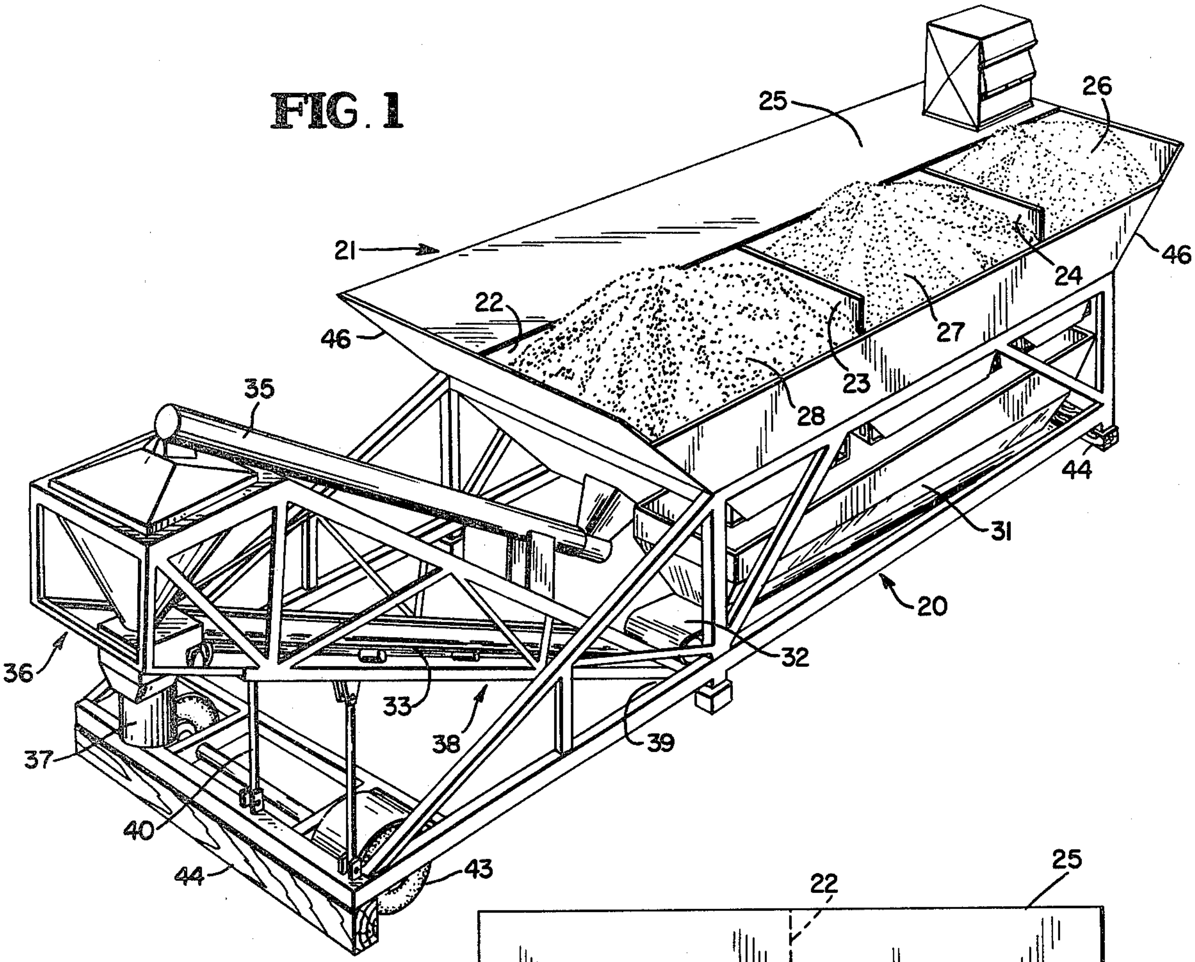
FIG. 1 is a perspective view of the mobile side-by-side batching plant mounted on a unitary frame.
Figure 2:
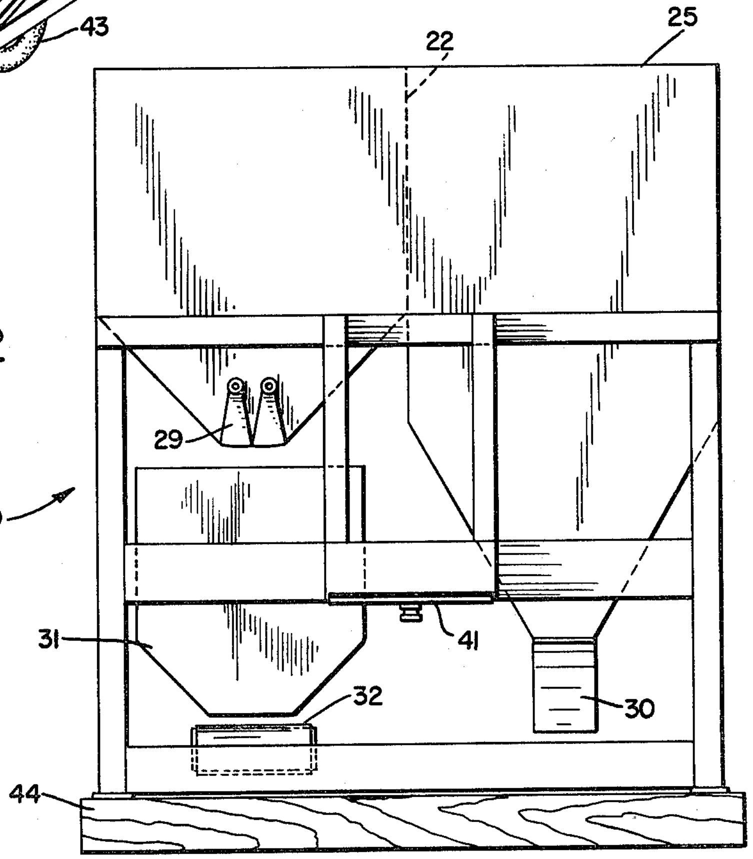
FIG. 2 is a sectional view taken along lines 2—2 of FIG. 1.

Referring to the drawings in detail, 20 designates the main or transport frame upon which is carried a unitary receptacle 21. The receptacle 21 is provided with a longitudinal partition 22 substantially dividing it in two longitudinal parts. One part thereof is further provided with transverse partitions 23, 24. The arrangement of partitions, as shown in FIG. 1, creates a cement storage bin 25 and three aggregate storage bins 26, 27, 28. Each of the bins is of hoppered type for the purpose of metered discharge of the material contained therein. The discharge control means for the aggregate storage bins 26, 27, 28 is shown at 29 in FIG. 2. From the storage bin 25, the cement is discharged to an air slide 30 in the bottom of the bin and fed to the cement screw 34, which in turn charges the cement batcher 36. The cement then discharges directly by gravity into the truck mixer. It is obvious that more or less aggregate storage bins may be provided, if desired. The end walls of the receptacle are inclined inwardly toward each other as is shown at 46.

A receiving hopper 31 is mounted upon the transport frame for the weighing reception of the aggregates metered from the bins 26, 27, 28, wherefrom the aggregates are discharged by means of a transport conveyor 32. The conveyor 32 carries the aggregate longitudinally rearwardly and discharges it to an elevating conveyor 33. Both the conveyors 32, 33 are of endless trough type.

The cement storage bin 25 is normally enclosed to prevent undesirable absorption of moisture from the ambient atmosphere. The metered cement is discharged to a screw conveyor 34 contained within a housing 35. Because cement is a powder, as distinguished from the granular or stony material contained in the aggregate storage bins, endless conveyors are totally unsuited for transport thereof. It has been found that the archimedean screw is very satisfactory. The screw conveyor 34 delivers the metered cement into a weigh batcher 36.

Both the endless conveyor 33 and the cement batcher 36 discharge the batched materials by way of the spout 37 from whence the batch is delivered to a batch receiving vehicle or mixing device.

Figure 3:
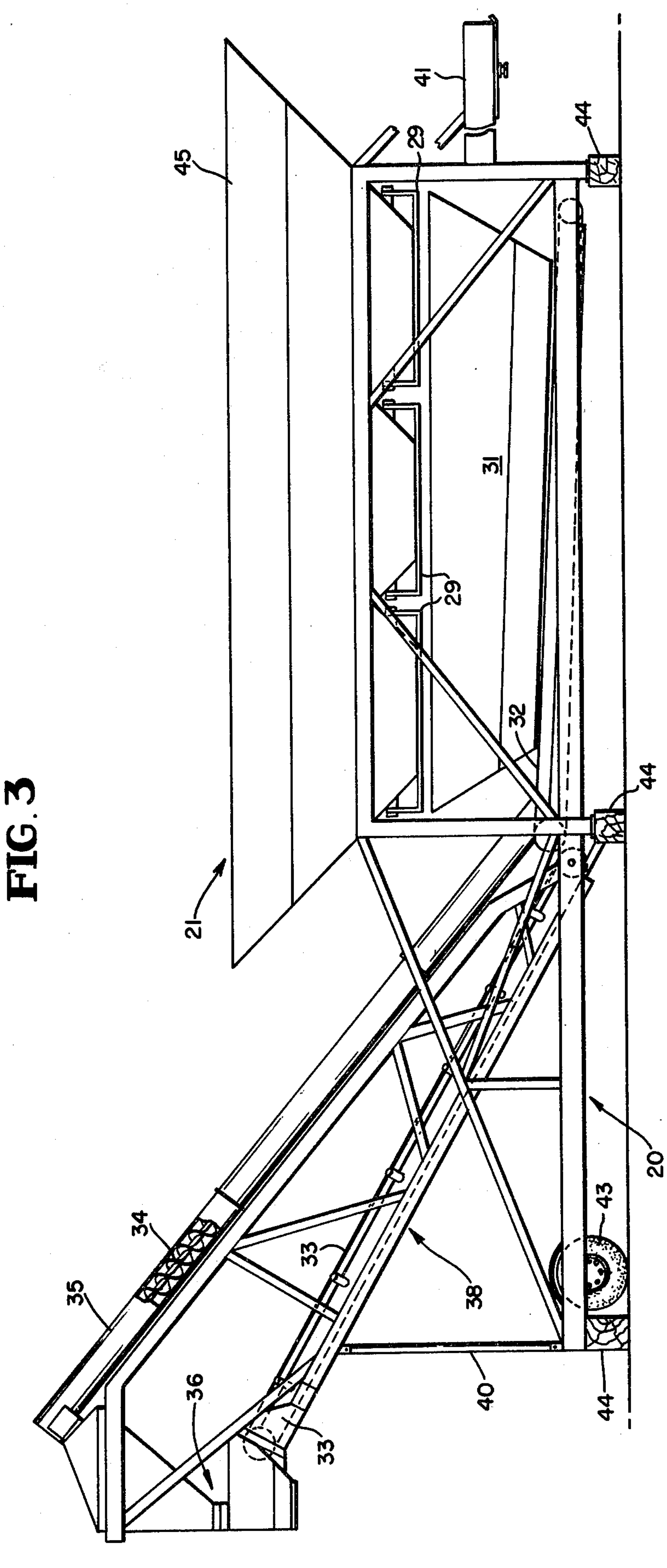
FIG. 3 is a view taken along one longitudinal side and showing the several aggregate storage bins and with the delivery conveyors in elevated, operative position.
Figure 4:
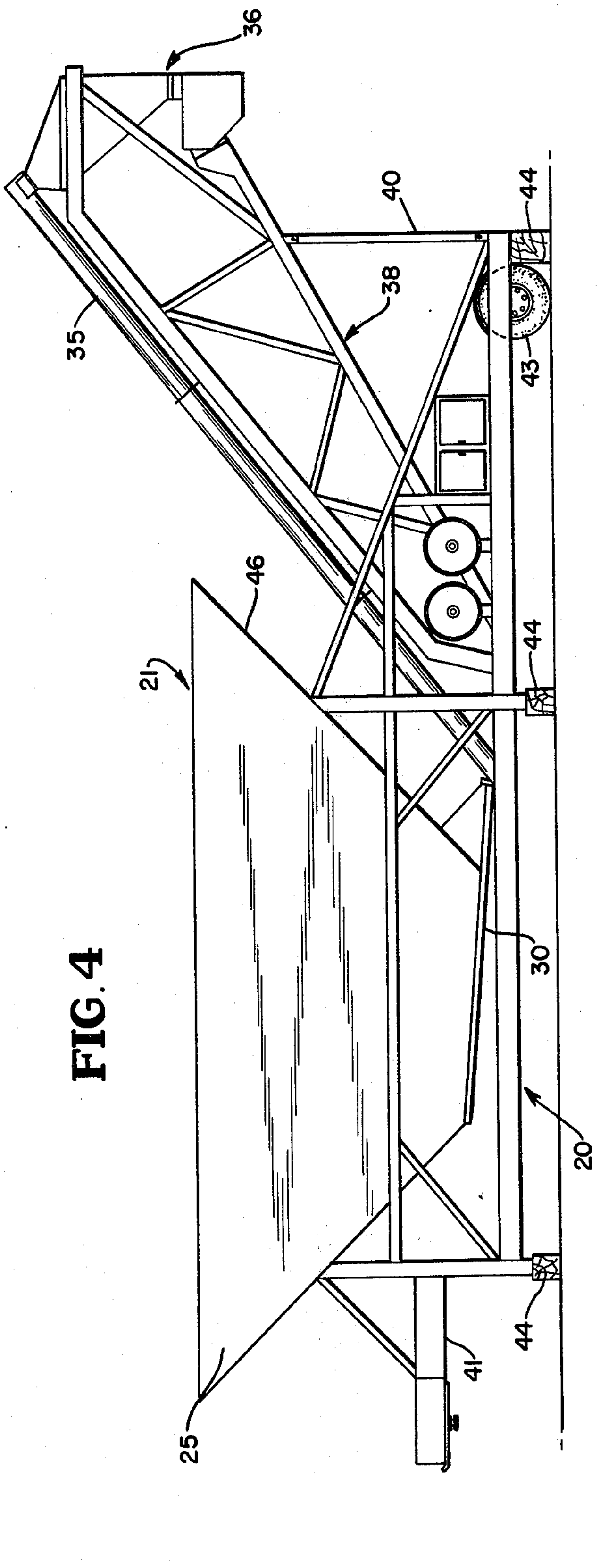
FIG. 4 is a view similar to FIG. 3, but taken along the other longitudinal side and showing the cement storage bin.

The conveyors 33, 34 are mounted upon an auxiliary frame 38 which, in turn is pivoted to the main or transport frame 20 at 39. The auxiliary frame is adjustably positioned relative to the main frame by extensible pinned supports 40, whereby to permit movement of the auxiliary frame from a collapsed transport position shown in FIG. 5 and an erect operative position shown in FIGS. 1, 3 and 4. Movement of such frame may be readily accomplished by a winch or other suitable well known means.

Figure 5:
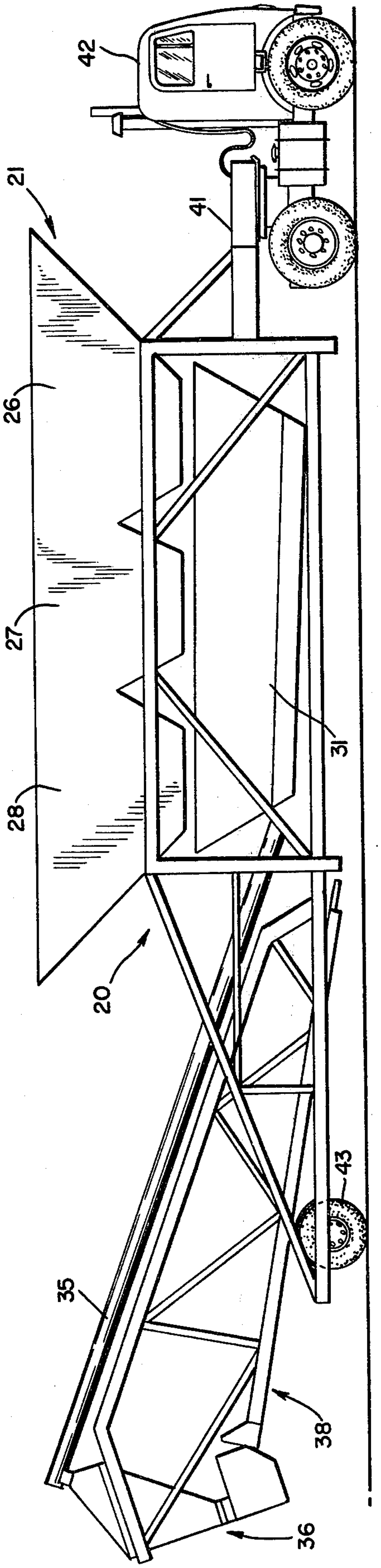
FIG. 5 is a view similar to FIGS. 3 and 4, but showing the delivery conveyors in lowered transport position and further illustrating the towing vehicle.

Assuming that the side-by-side batching plant is being transported to the job site, it will be noted from the view of FIG. 5 that the front end 41 of the frame is mounted on a towing vehicle 42 and the rear end is supported by conventional truck wheels 43. Upon arrival at the work site suitable frame supporting means, such as blocks 44, are placed under the frame and the towing vehicle is removed. The frame supporting means at the rear of the frame serves further to block the wheels 43. These supporting means provide a stable foundation for the entire device during its several operations. The auxiliary frame is then erected to the position shown in FIGS. 1, 3 and 4 whereupon the supports 40 are extended and pinned. Upon connection of the several operating means to appropriate sources of power, the device is ready for operation.

Other salient characteristics of the unitary receptacle 21 are the fact that the longitudinal partition 22 provides a cement storage bin 25 which is substantially one-half of the entire receptacle volume. The side-by-side concept eliminates the need for an elevated silo. Since everything is located at grade, the plant is merely blocked in position, with no foundation required, the discharge section supported upon the auxiliary frame is raised into position and secured with the pinned supports. The receptacle 21 may be provided with removable side plates 45 which, when removed, substantially reduce the charging height for use with smaller loaders. With all aggregate being loaded from one side the design is readily adaptable to a radial belt conveyor charging system.

It can be readily seen that the side-by-side aggregate bins of the unitary receptacle provides a structure which permits charging of the bins from one side of the frame. The position of the cement storage bin eliminates the need for raising or pivoting it for use. This feature is extremely useful when the plant is disposed in confined quarters and head room is limited.

The position and size of the cement storage bin is not merely a matter of taking a known design device limited to aggregate only and putting the cement in one of the compartments. The handling of cement is entirely different from aggregate and requires different conveying devices because it is a powder and not granular. Further, the capacity of the cement storage bin is important in order to properly schedule the proportions with the aggregates as are essential to provide a proper mix.

Figure 6:
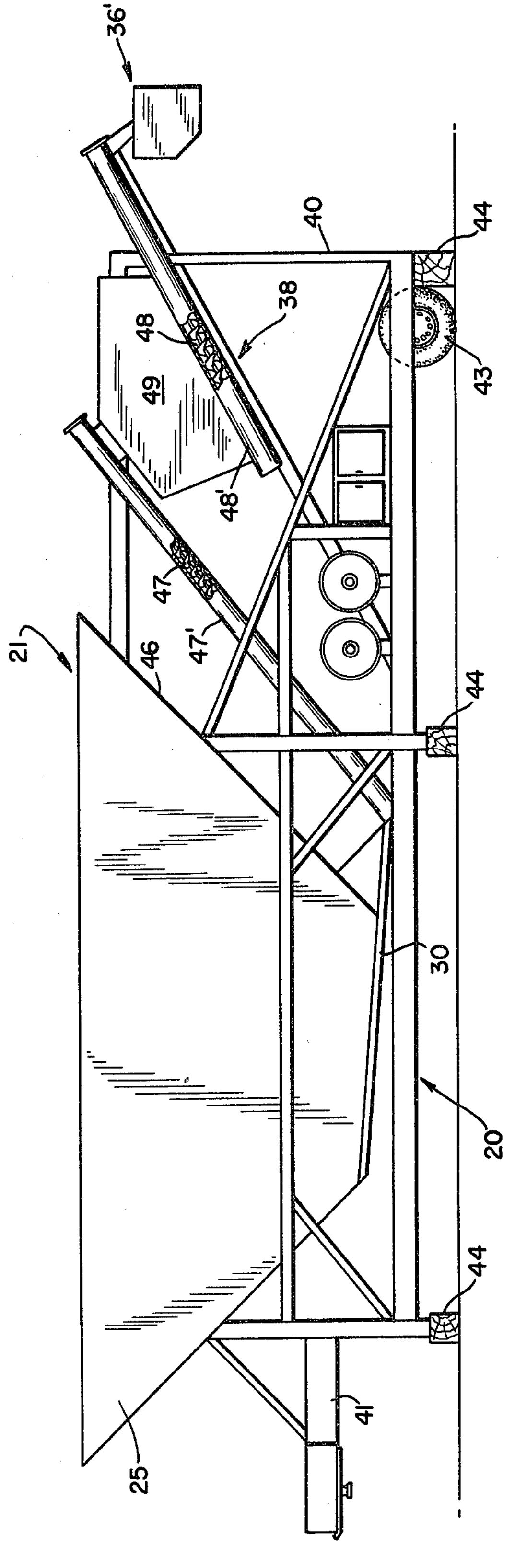
FIG. 6 is a view similar to FIG. 3, but illustrating a modified form of the invention.

In the modification shown in FIG. 6, the same unitary receptacle and associated supporting frame are utilized, as in FIGS. 1–5. However, in this arrangement the screw conveyor 34 and housing 35 have been replaced by two screw conveyors 47, 48 and housings 47′, 48′. From the storage bin 25, the cement is discharged to an air slide 30 in the bottom of the bin and feeds to the cement screw 34, which in turn charges the cement batcher 49. Thereby the weighed cement is discharged and elevated by the screw conveyor 48 by way of the spout 37 from whence the batch being delivered by belt conveyor 33 is discharged to a batch receiving vehicle or mixing device. With this arrangement several conveyors are fixedly mounted upon the main transport frame and there is no need to provide the auxiliary frame 38 pivoted to the main frame thereby eliminating movement of such frame during set up for operation. The conveyors 47, 48 and cement batcher 49 remain in one fixed position, whether for transport or in operation, since the overall height of the plant is substantially the height of the receptacle.

There has therefore been provided a plant where the mixer is mounted integrally on the main transport frame 20 below the spout 37 to provide a complete central mix plant. Further, in this modification, the cement batcher shown in FIG. 6 as 49, has been moved further toward the unitary receptacle and lowered as it is moved down the endless conveyor 33. In this case, the screw conveyor 48 discharges and elevates the weighed cement back up to the mixer charge opening.

What I claim is:

1. A mobile side-by-side pre-erected batching plant having transport wheels at one end thereof for the proportioning of materials for the production of concrete, whereby said pre-erected batching plant at the job site requires only blocking and leveling of the main frame to position the structure for the discharge of aggregates and cement at a truck charging elevation, said plant comprising a longitudinally substantially rectangular supporting main frame; a substantially rectangular unitary receptacle fixedly mounted thereon and provided with separating partitions therein, said partitions comprising a longitudinal wall dividing the receptacle substantially in half and a plurality of transverse walls extending substantially perpendicularly from said longitudinal wall to a wall of said receptacle on one side thereof, thereby providing a plurality of aggregate receiving bins in one-half of said receptacle and a cement receiving bin in other half; means controlling the discharge of material from each of said bins, said means being disposed adjacent the lower portion of each bin; aggregate weighing means positioned beneath said means for controlling the discharge of material from each of said bins, a first longitudinally extending transport conveyor means mounted on said weighing means and disposed in receiving relation to said aggregate weighing means, a second longitudinally extending transport conveyor means pre-erected to receive aggregates from said first longitudinally extending transport conveyor means and to discharge aggregates at said truck charging elevation; and a first longitudinally extending cement transport conveyor means mounted in an inclined pre-erected condition to receive cement from said cement bin at its lower end, cement weighing means positioned to receive cement from said first cement conveyor and a second longitudinally extending cement conveyor transport means receiving cement from said cement weighing means to discharge cement at said truck charging elevation.

2. An apparatus as claimed in claim 1 wherein said second longitudinally extending transport conveyor and said second longitudinally extending cement conveyor transport means are operatively associated with a common discharge spout at a truck charging elevation.

3. An apparatus as claimed in claim 2 wherein said longitudinally substantially recetangular supporting main frame is supported at its end remote from the end having said transport wheels by a separable towing vehicle.

* * * * *